United States Patent [19]
Plutschuck et al.

[11] Patent Number: 5,516,241
[45] Date of Patent: May 14, 1996

[54] HOLDER BLADE

[75] Inventors: Lawrence Plutschuck, Warren; Stanley Mickel, Ortonville, both of Mich.

[73] Assignee: Valenite Inc., Madison Heights, Mich.

[21] Appl. No.: 266,057

[22] Filed: Jun. 27, 1994

[51] Int. Cl.[6] .............................. B26D 1/00; B23B 29/14; B23B 27/04
[52] U.S. Cl. .................................................. 407/110
[58] Field of Search .............................. 407/91, 110, 117

[56] References Cited

U.S. PATENT DOCUMENTS

| | | | |
|---|---|---|---|
| 2,836,240 | 5/1958 | Nuding | 407/117 |
| 3,894,322 | 7/1975 | Pano | 407/117 |
| 4,357,123 | 11/1982 | Zweekly | 407/110 |
| 4,901,224 | 1/1989 | Pettersson et al. | 407/110 |
| 5,079,979 | 1/1992 | Pano | 407/110 |

*Primary Examiner*—M. Rachuba
*Assistant Examiner*—Kenneth J. Hansen
*Attorney, Agent, or Firm*—John W. Gregg

[57] ABSTRACT

A holder blade is provided which includes an elongated member including an insert cavity for securing an insert in place. The insert cavity includes opposing surfaces which include V-shaped lengths which engage corresponding V-shaped lengths provided in opposite surfaces of the insert. A camming action is provided so that the opposing surfaces of the insert cavity may tightly grip the insert.

18 Claims, 2 Drawing Sheets

HOLDER BLADE

BACKGROUND OF THE INVENTION

1. Field of the Invention

The present invention relates to a holder blade for clamping in place a metal cutting insert of a tool such as, for example, a cut-off or parting tool.

2. Description of Prior Art

It is known to provide a holder blade which holds a metal cutting insert in place while performing metal cutting operations such as cutting off and grooving. Such a holder blade is typically a relatively narrow insert support which is held in place by being clamped in dove-tailed holders attached to the machine tool. Known prior art holder blades include an aperture into which the cutting insert is inserted such that the insert cutting edge extends beyond the holder blade for cutting a workpiece, the aperture having substantially planar upper and rear surfaces, and a lower surface having a generally V-shaped design, which conforms to mating surfaces of the insert. An example of one known holder blade is described in U.S. Pat. No. 4,357,123 to Zweekly which is incorporated herein by reference. In such a device, after extended use the force exerted by the opposing surfaces or jaws of the holder blade which engage the cutting insert to hold it in place tends to decrease. The result is that the insert will have a tendency to slide or otherwise move relative to the opposing surfaces or jaws and this will tend to adversely affect the accuracy of the cutting operation. Such a sloppy fit is undesirable In an extreme situation the holder blade may actually break, typically at a position located at a narrow land area between the aperture into which the insert has been inserted and an inner terminus of a slit which is provided in the holder blade to facilitate the camming action which holds the insert in place. Whether the insert moves relative to the holder blade or the holder blade actually breaks, it will be necessary to shut down the machine and replace the holder blade.

It is an object of the present invention to provide an improved holder blade.

It is another object of the present invention to provide such a holder blade wherein the tendency of the insert held by the holder blade to move relative thereto after extended use will be substantially reduced.

Yet another object of the present invention is to provide such a holder blade which will have less of a tendency to break after extended use.

SUMMARY OF THE INVENTION

This invention achieves these and other results by providing a holder blade comprising a member extending along a longitudinal axis and having a first end and an opposite second end and an upper surface and a lower surface. At least one end comprises an insert cavity segment which includes an insert cavity extending into an end of the member, the insert cavity having a first surface and an opposite second surface. The first surface and the opposite second surface each comprises a centered V-shaped length which extends in an insert receiving direction of the insert cavity and is configured to mate with corresponding V-shaped lengths of opposing surfaces of an insert. An aperture extends through the member in the direction of a transverse axis, the aperture comprising a cam follower surface. The upper surface of the member includes an opening which communicates with the aperture. A first elongated slot extends through the member in the direction of the transverse axis and is oriented towards the insert cavity at a first angle relative to the longitudinal axis. The first elongated slot is positioned at a location between the insert cavity and the aperture and communicates with the aperture to form a resilient segment of the member which extends from the first surface to the opening in the upper surface. A cam is positioned in the aperture for rotational movement relative to the cam follower surface and includes a cam surface which is engagable and disengagable with the cam follower surface when the cam is rotated. Engagement of the cam surface with the cam follower surface causes the resilient segment to bend and move the first surface towards the opposite second surface, and disengagement of the cam surface from the cam follower surface causes the resilient segment to spring back to its initial position and move the first surface away from the opposite second surface.

BRIEF DESCRIPTION OF THE DRAWINGS

This invention may be clearly understood by reference to the attached drawings in which.

DESCRIPTION OF THE PREFERRED EMBODIMENT

Figure 1:
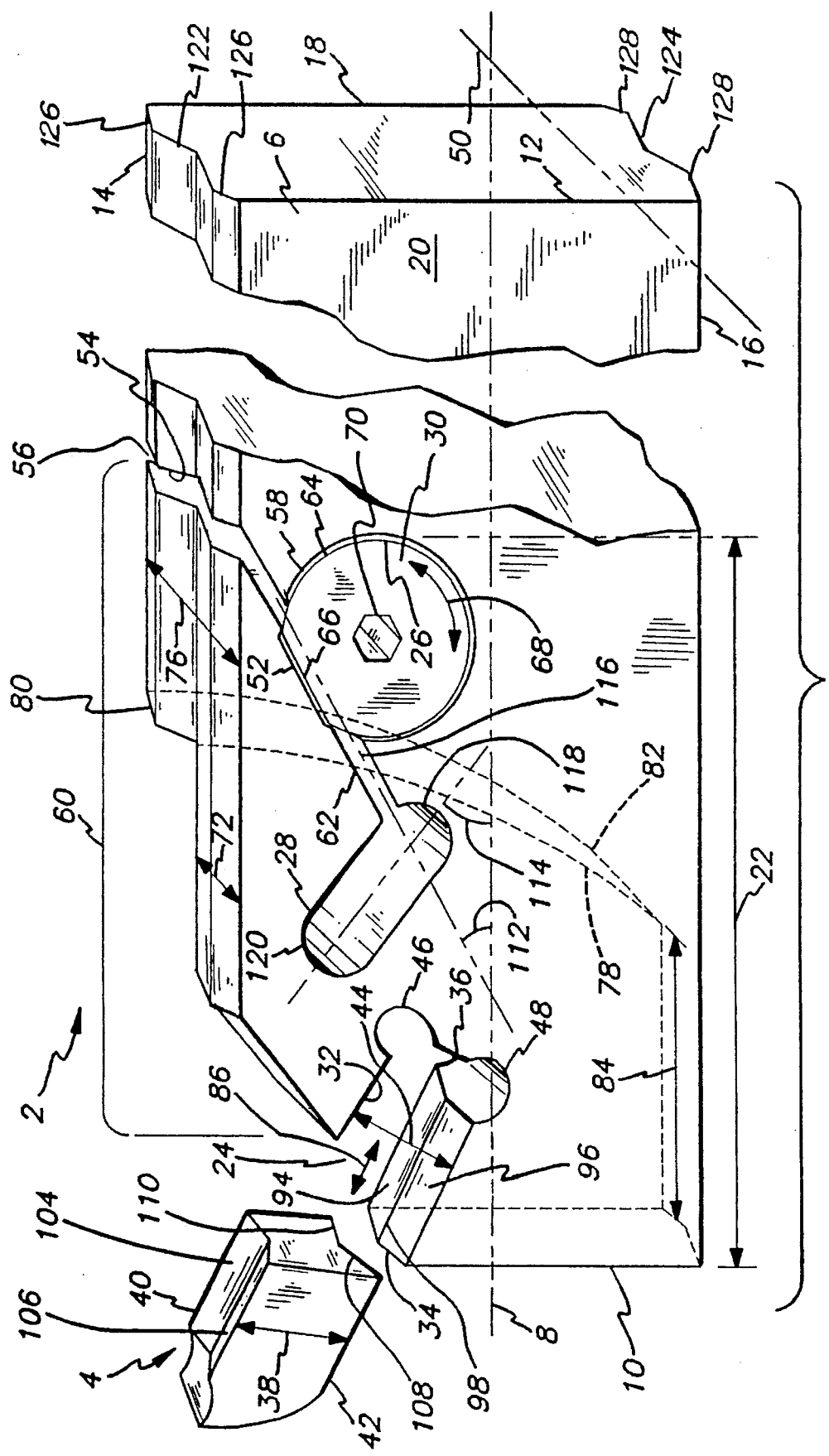
FIG. 1 is a perspective view of a holder blade of the present invention.

The embodiment which is depicted in the drawings is one which is particularly suited for achieving the objects of the invention. FIG. 1 depicts a holder blade 2 for supporting an insert 4 relative to a workpiece (not shown) to be cut by the insert. Holder blade 2 comprises a narrow member such as elongated member 6 which extends along longitudinal axis 8. Member 6 has an end 10, an opposite end 12, an upper surface 14, a lower surface 16, a side surface 18 and an opposite side surface 20. The ends are perpendicular to the top and bottom surfaces and to the side surfaces as depicted in FIG. 1.

At least one of the ends 10, 12 of the member 6 of the present invention comprises an insert cavity segment 22 which includes an insert cavity 24, an aperture 26, an elongated slot 28 and a cam 30.

Insert cavity 24 extends into end 10 of member 6 and includes an upper surface 32, an opposite lower surface 34 and a base 36 which form the boundaries of the insert cavity 24 as depicted in FIG. 1. The insert cavity 24 is dimensioned such that when an insert is inserted therein, the cutting edge of the insert will extend beyond the end 10. Surfaces 32 and 34 have a configuration which mates with respective surfaces of the insert 4 when the insert is inserted into the insert cavity 24. In the embodiment of FIG. 1, the angular orientation of surfaces 32 and 34 and base 36 is such that when the insert 4 is inserted into the insert cavity 24, respective surfaces of the insert adjacent surfaces 32 and 34, and base 36, will be substantially parallel thereto. In a preferred embodiment, surfaces 32 and 34 are oriented at 30° relative to axis 8. The height 38 of the insert and the distance 44 between surfaces 32 and 34 is such that when the holder blade 2 is disengaged as described herein and an insert 4 has been inserted into insert cavity 24, surfaces 32 and 34 will be in close proximity to respective adjacent insert surfaces 40 and 42 but it will still be possible to readily slide the insert into and out of the cavity. In a preferred embodiment, the corners of the base 36 will include cut out portions in the shape of cylindrical segments 46 and 48 which extend through member 6 in the direction of transverse axis 50 which in the preferred embodiment extends at 90° relative to longitudinal axis 8.

Aperture 26 also extends through member 6 in the direction of transverse axis 50. Aperture 26 is generally cylindrical but includes a flat chord segment 52 Which extends through member 6 in the direction of axis 50 and forms a cam follower surface. Upper surface 14 includes an opening 54 which communicates with aperture 26. In the preferred embodiment, aperture 26 communicates with opening 54 by means of an elongated slot 56 which extends through member 6 in the direction of transverse axis 50. In the preferred embodiment the surfaces of slot 56 are parallel to each other. As depicted in FIG. 1, slot 56 extends from aperture 26 to the upper surface 14 at opening 54. It is preferred that aperture 26 be counter sunk at 58 at surface 20 of member 6.

Elongated slot 28 extends through member 6 in the direction of transverse axis 50. Slot 28 is positioned between the insert cavity 24 and the aperture 26 as depicted in FIG. 1. Slot 28 communicates with the aperture 26 to form a resilient segment 60 of member 6 which extends from the first surface 32 of the insert cavity to the opening 54 in the upper surface 14. In the preferred embodiment, slot 28 communicates with aperture 26 by means of an elongated slot 62 which extends through member 6 in the direction of transverse axis 50. In the preferred embodiment the surfaces of slot 62 are parallel to each other. Slot 62 extends from slot 28 to aperture 26 as depicted in FIG. 1.

Cam 30 is positioned in aperture 26 for rotational movement relative to cam follower surface 52. Cam 30 is generally cylindrical and includes a cylindrical segment 64 which forms a cam surface and a chord segment 66. Segments 64 and 66 preferably extend in the direction of axis 50. Cam surface 64 is engagable and disengagable with the cam follower surface 52 when the cam 30 is rotated in a clockwise or counterclockwise direction as depicted by arrow 68. Cam 30 includes a hexagonal aperture 70 into which a hexagonal wrench (not shown) may be inserted for use in rotating cam 30 relative to aperture 26 as described herein.

In the preferred embodiment, the width 72 of an end segment of the member 6 is less than the width 76 of an adjacent segment of the member 6. Such end segment extends from end 10 to a location between the insert cavity 24 and the opening 54 in upper surface 14. In the preferred embodiment, a portion of the member 6 adjacent such end segment comprises a concave curved surface 78 which extends in the direction of axis 50 and faces the end 10. The concave curved surface 78 extends from upper surface 14 to lower surface 16 and intersects the upper surface at a first line of intersection 80 and intersects the lower surface at a second line of intersection 82. As can be seen in FIG. 1, the length of the end segment between the line of intersection 80 and end 10 is greater than the length 84 between the line of intersection 82 and end 10.

In the embodiment depicted in the drawings, the first surface 32 of the insert cavity 24 and the opposite second surface 34 each comprise a centered V-shaped member or length which extends in an insert receiving direction 86 of the insert cavity and is configured to mate with corresponding V-shaped members of opposing surfaces of insert 4. For example, in the embodiment of FIGS. 1 and 2, surface 32 comprises a first leg 88 and an adjacent second leg 90 of equal width which intersect at an apex 92 which extends towards opposite surface 34. Similarly, surface 34 comprises a first leg 94 and an adjacent second leg 96 of equal width which intersect at an apex 98 which extends towards apex 92. In the preferred embodiment, an inclusive angle 100 between legs 88 and 90 and an inclusive angle 102 between legs 94 and 96 will be equal to about 144°.

Figure 2:
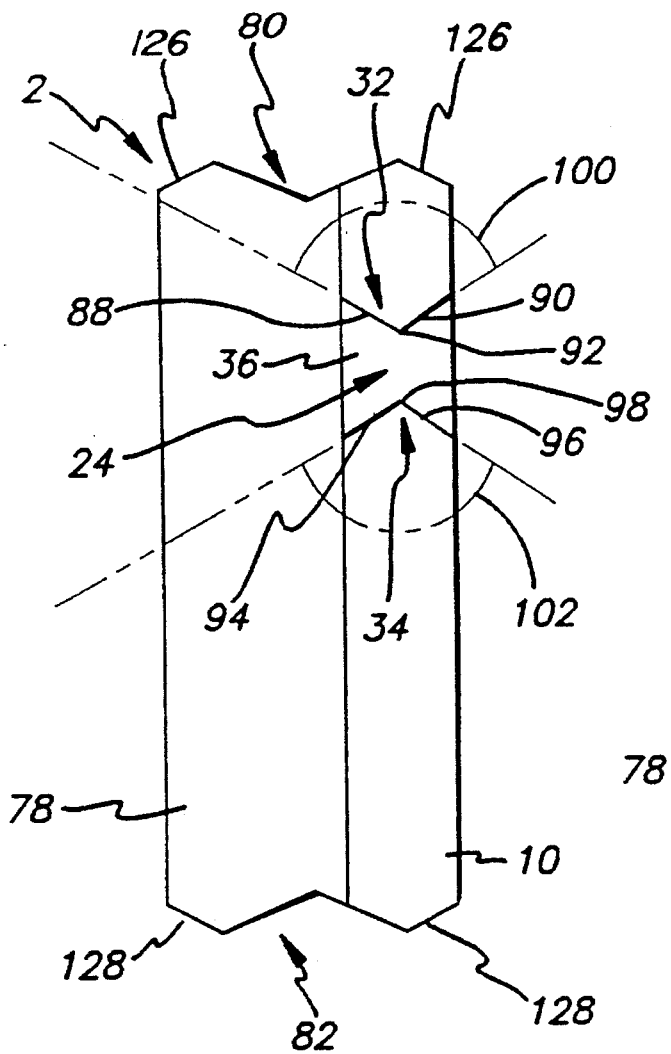
FIG. 2 is an end view of end 10 of the holder blade of FIG. 1 with the insert removed for clarity.
Figure 3:
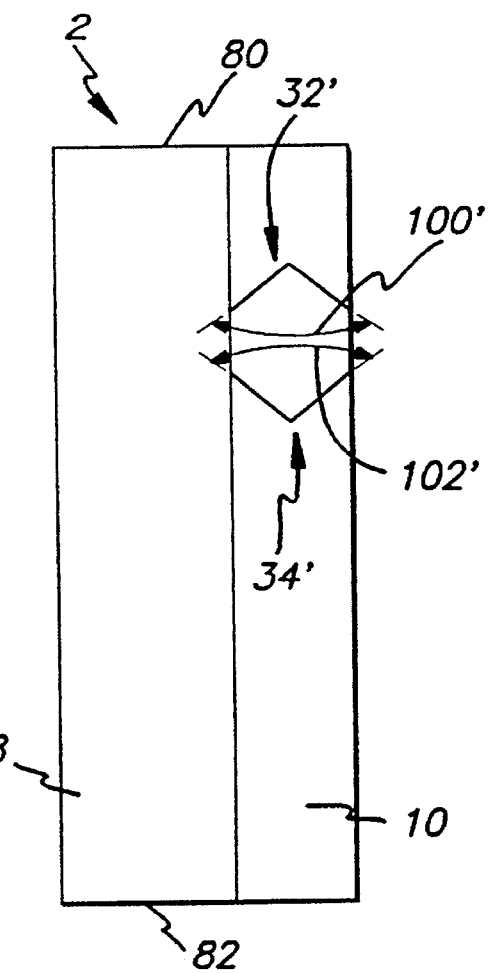
FIG. 3 is an end view similar to FIG. 2 but of an alternative embodiment of a holder blade of the present invention.

The device of FIGS. 1 and 2 is particularly useful with an insert such as insert 40. As depicted in FIG. 1, insert 40 includes surfaces 104 and 106 of equal width which form a V-shaped groove having an inclusive angle of 144° therebetween so that surface 40 will mate with the V-shaped protuberance formed at surface 32 by legs 88 and 90 when the insert 4 is inserted into insert cavity 24. Similarly, insert 40 includes surfaces 108 and 110 of equal width which also form a V-shaped groove having an inclusive angle of 144° therebetween so that surface 42 will mate with the V-shaped protuberance formed at surface 34 by legs 94 and 96 when the insert 4 is inserted into insert cavity 24. In the embodiment of FIGS. 1 and 2, insert cavity surfaces 32 and 34 are in the shape of V-shaped protuberances and surfaces 40 and 42 are in the shape of V-shaped grooves. It will be apparent to those skilled in the art that in an alternate embodiment as depicted in FIG. 3, wherein like reference numerals denote like elements, the insert cavity surfaces 32' and 34' may be in the shape of V-shaped grooves which in a preferred embodiment will have an inclusive angle 100' and 102', respectively, of about 144°. In such an embodiment, the surfaces 40 and 42 of the insert 4 will be in the shape of mating V-shaped protuberances rather than the V-shaped grooves depicted in FIG. 1.

In the preferred embodiment, elongated slot 56 is oriented away from the insert cavity 24 at an angle 112 relative to longitudinal axis 8 which is preferably about 30°. It is also preferred that elongated slot 28 be oriented towards the insert cavity 24 at an angle 114 relative to longitudinal axis 8 which is preferably about 40°. In the preferred embodiment, elongated slot 62 is also oriented away from the insert cavity 24 at angle 112 relative to the longitudinal axis 8. It is also preferred that the cam follower surface 52 be oriented away from the insert cavity 24 at angle 112 and be parallel to the surfaces of slots 56 and 62. In the preferred embodiment, slots 56 and 62 are coextensive along axis 116, which is oriented at angle 112 relative to axis 8. As depicted in FIG. 1, elongated slot 28 may comprise a radiused first end 118 and a radiused opposite second end 120, ends 118 and 120 extending through member 6 in the direction of axis 50.

In the preferred embodiment, upper surface 14 and lower surface 16 each comprise a V-shaped length which extends in the direction of axis 8. For example, in the embodiment of FIGS. 1 and 2 V-shaped lengths in the shape of V-shaped grooves 122 and 124 extend the length of surfaces 14 and 16, respectively. If desired, the edges of the surfaces 14 and 16 may be chamfered at 126 and 128, respectively.

Figure 4:
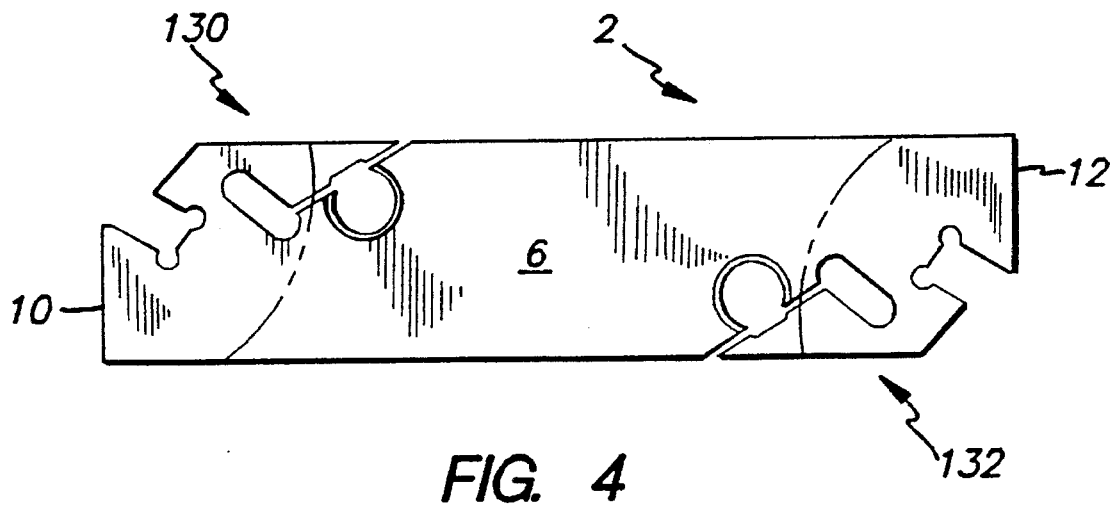
FIG. 4 is a diagrammatic representation of another alternative embodiment of a holder blade of the present invention.

FIG. 1 depicts a holder blade 2 with an insert cavity segment 22 in an upper left hand corner of the elongated member 6. In an alternate embodiment schematically depicted in FIG. 4, where like numbers designate like elements, an elongated member 6 is provided which comprises an upper corner 130 at first end 10 and a lower corner 132 at opposite second end 12, the lower corner being disposed diagonally relative to the upper corner. Upper corner 130 includes a first insert cavity segment 22 and lower corner 132 includes a second insert cavity segment 22 of the type depicted in FIG. 1.

The operation of the holder blade 2 will now be explained with reference to FIG. 1 which depicts the resilient segment 60 in its initial position before cam surface 64 contacts cam follower surface 52. In operation, an insert 4 is inserted into insert cavity 24 until the insert engages base 46. Subsequently, a hexagonal wrench (not shown) is inserted into, mating hexagonal aperture 70 in the cam 30, and the cam 30 is rotated in, for example, a clockwise direction so that the cam surface 64 engages cam follower surface 52 causing the resilient segment 60 to flex or bend towards axis 8 to thereby move the first surface 32 towards the opposite second surface 34 to grip the insert 4. In particular, the V-shaped protuberances which form insert cavity surfaces 32 and 34 will intimately grip the respective mating V-shaped grooves which form insert surfaces 40 and 42 to hold the insert in the desired orientation and firmly in place. In order to remove the insert 4 from the insert cavity 24, the hexagonal wrench is inserted into hexagonal aperture 70, and the cam is rotated, for example, in a counterclockwise direction to disengage cam surface 64 from cam follower surface 52 causing the resilient segment 60 to flex or spring back to its initial position depicted in FIG. 1 as a result of the resiliency of the segment to thereby move the first surface 32 away from the opposite second surface 34 to release the insert 4.

It is believed that the presence of the V-shaped lengths at surfaces 32 and 34 will substantially prevent lateral movement of the insert 40 relative to member 6 even after extended use. It is further believed that the presence of the elongated slot 28 will serve to reduce the tendency of the holder blade to become weakened or to break after extended use.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A holder blade comprising a member extending along a longitudinal axis and having a first end and an opposite second end and an upper surface and a lower surface, at least one of said first end and said opposite second end comprising an insert cavity segment, said insert cavity segment comprising:

an insert cavity extending into an end of said member, said insert cavity having a first surface and an opposite second surface, said first surface and said opposite second surface each comprising a V-shaped segment which extends in an insert receiving direction of said insert cavity and is configured to mate with corresponding V-shaped segments of opposing surfaces of an insert;

an aperture extending through said member in the direction of a transverse axis, said aperture comprising a cam follower surface, said upper surface having an opening which communicates with said aperture;

a first elongated slot extending through said member in the direction of said transverse axis and being oriented towards said insert cavity at a first angle relative to said longitudinal axis, said first angle aligning the length of said first elongated slot in the direction of the length of the insert cavity, said first elongated slot being positioned at a location between said insert cavity and said aperture and communicating with said aperture via a second elongated slot extending through said member in the direction of said transverse axis and being oriented away from said insert cavity at a second angle relative to said longitudinal axis, said second angle being different from said first angle and said second elongated slot extending from said first slot to said aperture, said aperture communicating with said opening in said upper surface via a third elongated slot extending through said member in the direction of said transverse axis and oriented away from said cavity in the direction of said second angle, said first elongated slot, said aperture, said second elongated slot and said third elongated slot forming a resilient segment of said member, said resilient segment extending from said first surface to said opening in said upper surface; and a cam positioned in said aperture for rotational movement relative to said cam follower surface and having a cam surface which is engagable and disengagable with said cam follower surface when said cam is rotated, whereby engagement of said cam surface with said cam follower surface causes said resilient segment to bend and move said first surface towards said opposite second surface, and disengagement of said cam surface from said cam follower surface causes said resilient segment to spring back to its initial position and move said first surface away from said opposite second surface.

2. The holder blade of claim 1 wherein said aperture communicates with said opening of said upper surface by means of a third elongated slot extending through said member in the direction of said transverse axis, and being oriented away from said insert cavity at said second angle, said third slot extending from said aperture to said upper surface.

3. The holder blade of claim 1 wherein the width of an end segment of said member is less than the width of an adjacent segment of said member, said end segment extending from said first end to a location between said insert cavity and said opening in said upper surface, said insert cavity extending into said end segment.

4. The holder blade of claim 3 wherein said member comprises a concave curved surface adjacent said end segment, facing said first end and extending from said upper surface to said lower surface.

5. The holder blade of claim 4 wherein said concave curved surface intersects said upper surface at a first line of intersection and intersects said opposite lower surface at a second line of intersection, the distance between said first line of intersection and said first end being greater than the distance between said second line of intersection and said first end.

6. The holder blade of claim 1 wherein said V-shaped segment of said first surface comprises a first apex which extends towards said opposite second surface, and said V-shaped segment of said opposite second surface comprises a second apex which extends towards said first apex.

7. The holder blade of claim 1 wherein an included angle between legs of each V-shaped segment is about 144°.

8. The holder blade of claim 6 wherein an included angle between legs of each V-shaped segment is about 144°.

9. The holder blade of claim 1 wherein at least one of said upper surface and said lower surface of said member comprises a V-shaped length which extends in the direction of said longitudinal axis.

10. The holder blade of claim 9 wherein said V-shaped length is a V-shaped groove which extends in the direction of said longitudinal axis the length of at least one of said upper surface and said lower surface.

11. The holder blade of claim 1 wherein said member includes an upper corner at said first end and a lower corner at said opposite second end, said lower corner being disposed diagonally relative to said upper corner, said upper corner including a first insert cavity segment and said lower corner including a second insert cavity segment.

12. The holder blade of claim 1 wherein said first angle is about 40° relative to said longitudinal axis.

13. The holder blade of claim 1 wherein said second angle is about 30° relative to said longitudinal axis.

14. The holder blade of claim 1 wherein said first elongated slot comprises a radiused first end and a radiused opposite second end.

15. The holder blade of claim 1 wherein said cam follower surface is oriented away from said insert cavity at said second angle.

16. A holder blade comprising a member extending along a longitudinal axis and having a first end and an opposite second end and an upper surface and a lower surface, at least one of said first end and said opposite second end comprising an insert cavity segment, said insert cavity segment comprising:

an insert cavity extending into an end segment of said member at said first end, said insert cavity having a first surface and an opposite second surface, said first surface and said opposite second surface each comprising a V-shaped length which extends in an insert receiving direction of said insert cavity and is configured to mate with corresponding V-shaped lengths of opposing surfaces of an insert, the width of said end segment of said member being less than the width of an adjacent segment of said member, said member comprising a concave curved surface adjacent said end segment, facing said insert cavity and extending from said upper surface at a first position to said lower surface at a second position, said second position being closer to said first end than is said first position;

an aperture extending through said member in the direction of a transverse axis, said aperture comprising a cam follower surface which is oriented away from said insert cavity at a first angle relative to said longitudinal axis, said upper surface having an opening which communicates with said aperture by means of a first elongated slot which extends through said member in the direction of said transverse axis and is oriented away from said insert cavity at said first angle, said first elongated slot extending from said aperture to said upper surface;

a second elongated slot extending through said member in the direction of said transverse axis and being oriented towards said insert cavity at a second angle relative to said longitudinal axis so as to align the length of the second elongated slot in the direction of length of the insert cavity, said second elongated slot having a first radiused end segment and an opposite second radiused end segment, said second elongated slot being positioned at a location between said insert cavity and said aperture, said second elongated slot communicating with said aperture by means of a third elongated slot extending through said member in the direction of said transverse axis and being oriented away from said insert cavity at said first angle, said third elongated slot extending from said second elongated slot to said aperture, said first elongated slot, second elongated slot, third elongated slot and aperture extending through said member to form a resilient segment of said member which extends from said first surface to said opening in said upper surface; and a cam positioned in said aperture for rotational movement relative to said cam follower surface and having a cam surface which is engagable and disengagable with said cam follower surface when said cam is rotated, whereby engagement of said cam surface with said cam follower surface causes said resilient segment to bend and move said first surface towards said opposite second surface, and disengagement of said cam surface from said cam follower surface causes said resilient segment to spring back to its initial position and move said first surface away from said opposite second surface.

17. The holder blade of claim 16 wherein said first angle is about 30° relative to said longitudinal axis, said second angle is about 40° relative to said longitudinal axis and wherein an included angle between legs of each V-shaped length is about 144°.

18. The holder blade of claim 17 wherein said V-shaped length of said first surface comprises a first apex which extends towards said opposite second surface, and said V-shaped length of said opposite second surface comprises a second apex which extends towards said first apex.

* * * * *